United States Patent
Ziv et al.

(10) Patent No.: US 10,554,796 B2
(45) Date of Patent: Feb. 4, 2020

(54) MEMORY STATION FOR AUTOMATICALLY BACKING UP DATA AND CHARGING MOBILE DEVICES

(71) Applicant: Western Digital Technologies, Inc., San Jose, CA (US)

(72) Inventors: Aran Ziv, Foster City, CA (US); Anurag Chelamchirayil Muraleedha, Santa Clara, CA (US); Eyal Hakoun, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/801,250

(22) Filed: Nov. 1, 2017

(65) Prior Publication Data
US 2019/0132431 A1    May 2, 2019

(51) Int. Cl.
*H04B 5/00* (2006.01)
*H04M 1/02* (2006.01)
(Continued)

(52) U.S. Cl.
CPC ........ *H04M 1/0262* (2013.01); *G06F 1/1632* (2013.01); *G06F 1/1698* (2013.01);
(Continued)

(58) Field of Classification Search
CPC ........... H04M 1/0262; H04M 1/72569; H04M 2201/36; H04M 1/72527; H02J 50/80;
(Continued)

(56) References Cited

U.S. PATENT DOCUMENTS 8,565,729 B2 * 10/2013 Moseler ................ H02J 7/0004
455/412.1
9,521,223 B1 * 12/2016 Rajagopalan ........... H04W 4/80
(Continued)

FOREIGN PATENT DOCUMENTS

EP    3236358 A1    10/2017

OTHER PUBLICATIONS

Sayer, Peter, "Toshiba's smartphone backup device is for people who hate the cloud," PC World website, Sep. 1, 2016 (printed Apr. 28, 2017), available at https://www.pcworld.com/article/3115050/mobile/toshiba-hopes-cloudless-smartphone-backup-will-have-a-bright-future.html, in 5 pages.

(Continued)

*Primary Examiner* — Edward F Urban
*Assistant Examiner* — Max Mathew
(74) *Attorney, Agent, or Firm* — Chang & Hale LLP

(57) ABSTRACT

Disclosed herein are memory stations that are configured to charge a mobile device, to receive data for storage from the mobile device, and to transmit a trigger signal to the mobile device responsive to the beginning of a charge cycle to initiate the backup process. The disclosed systems and methods include starting a backup application on a mobile device responsive to a trigger signal. The trigger signal is generated and transmitted wirelessly by a memory station responsive to the memory station detecting the beginning of a charging cycle. In this way, the mobile device can automatically execute a backup program or application without user intervention. The disclosed memory stations and related methods beneficially enable seamless data backup while charging a mobile device. This can be accomplished with no user intervention.

27 Claims, 9 Drawing Sheets

(51) Int. Cl.
    *H04M 1/725*     (2006.01)
    *H04W 12/08*     (2009.01)
    *H02J 50/10*     (2016.01)
    *H02J 7/02*     (2016.01)
    *H02J 7/00*     (2006.01)
    *G06F 3/06*     (2006.01)
    *G06F 1/16*     (2006.01)
    *G06F 1/26*     (2006.01)
    *G06F 11/14*     (2006.01)
    *H02J 50/40*     (2016.01)
    *H02J 50/80*     (2016.01)

(52) U.S. Cl.
    CPC .............. *G06F 1/263* (2013.01); *G06F 3/065* (2013.01); *G06F 3/0619* (2013.01); *G06F 3/0679* (2013.01); *G06F 11/1456* (2013.01); *G06F 11/1458* (2013.01); *G06F 11/1461* (2013.01); *H02J 7/0004* (2013.01); *H02J 7/0027* (2013.01); *H02J 7/025* (2013.01); *H02J 50/10* (2016.02); *H02J 50/40* (2016.02); *H02J 50/80* (2016.02); *H04B 5/0031* (2013.01); *H04M 1/72569* (2013.01); *H04W 12/08* (2013.01); *H04M 2201/36* (2013.01)

(58) Field of Classification Search
    CPC .......... H02J 50/10; H02J 7/0004; H02J 7/025; H04B 5/0031; H04B 5/00; H04B 5/0012; H04B 5/02; H04W 12/08; H04W 88/06
    USPC ..................... 455/558.1, 557, 41.1
    See application file for complete search history.

(56) References Cited

U.S. PATENT DOCUMENTS

| | | | |
|---|---|---|---|
| 9,811,436 | B2 * | 11/2017 | Yeung .................... G06F 11/325 |
| 2004/0123127 | A1 * | 6/2004 | Teicher .................... G06F 21/78 |
| | | | 713/193 |
| 2005/0165869 | A1 | 7/2005 | Huang et al. |
| 2006/0158154 | A1 * | 7/2006 | Maurilus ........... H04M 1/72527 |
| | | | 320/115 |
| 2012/0190412 | A1 | 7/2012 | Buniatyan |
| 2012/0246374 | A1 | 9/2012 | Fino |
| 2014/0317058 | A1 * | 10/2014 | Chang ................. G06F 11/1448 |
| | | | 707/640 |
| 2014/0362745 | A1 * | 12/2014 | Davydov .............. H04W 36/22 |
| | | | 370/280 |
| 2015/0042269 | A1 * | 2/2015 | Koren ..................... H02J 7/025 |
| | | | 320/108 |
| 2015/0207343 | A1 * | 7/2015 | Zhai ...................... H02M 3/158 |
| | | | 320/112 |
| 2016/0299549 | A1 * | 10/2016 | Zeine ...................... H02J 50/80 |
| 2017/0083068 | A1 * | 3/2017 | Kashyap .................. G06F 1/26 |
| 2017/0331329 | A1 * | 11/2017 | Kim ........................ H02J 50/80 |
| 2018/0090966 | A1 * | 3/2018 | Grover .................... H02J 50/80 |

OTHER PUBLICATIONS

International Search Report and Written Opinion for PCT/US2018/052351 dated Dec. 20, 2018.

* cited by examiner

MEMORY STATION FOR AUTOMATICALLY BACKING UP DATA AND CHARGING MOBILE DEVICES

BACKGROUND

Field

This disclosure relates to devices that combine data storage and charging for mobile devices.

Description of Related Art

Users of mobile devices, such as smartphones or tablets, can create a large amount of data by taking video and pictures, creating documents, maintaining contact lists, and the like. It is generally desirable to save this user-created content to prevent losing media, documents, or information that valuable to a user. A user may purchase an external storage device to back up or copy data to preserve it. A typical user also regularly recharges the battery of their mobile device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
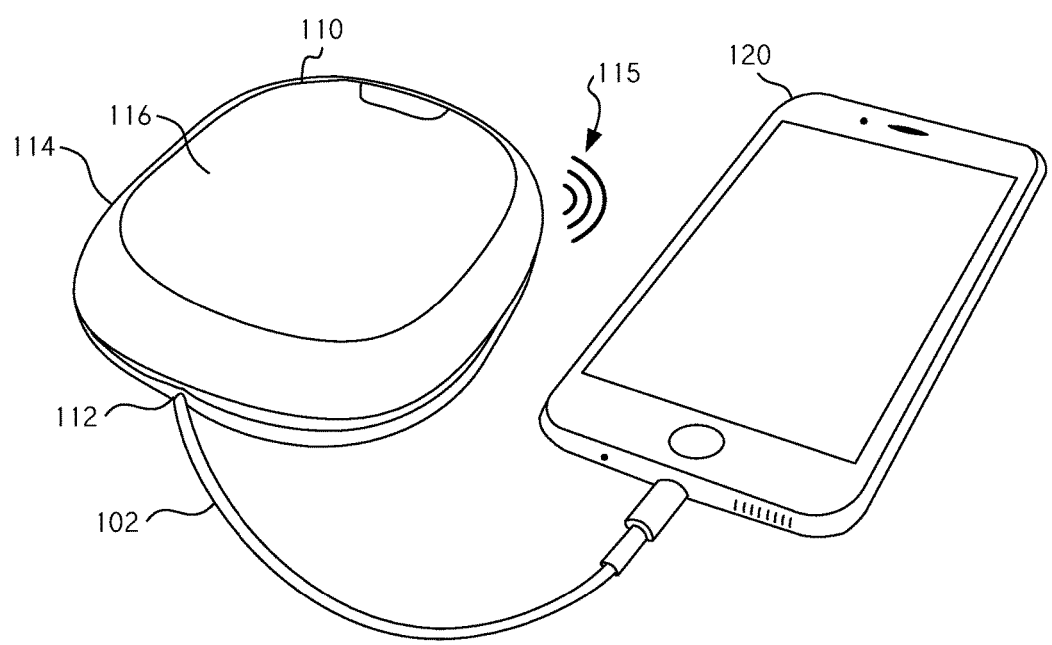
FIG. 1 illustrates an example embodiment of a memory station for charging and backing up data for a mobile device.

While certain embodiments are described, these embodiments are presented by way of example only, and are not intended to limit the scope of protection. Indeed, the methods and systems described herein may be embodied in a variety of other forms. Furthermore, various omissions, substitutions and changes in the form of the methods and systems described herein may be made without departing from the scope of protection.

Overview

Mobile devices can be used to generate content conveniently. For this reason, such devices can be used to create a large amount of data that is valuable to a user. It is desirable to provide a way to synchronize and/or backup this data in the case of loss or damage to the mobile device. However, it may be time-consuming and/or inconvenient to transfer data to a cloud service or to local storage. This may result in users failing to adequately back up their valuable data.

Mobile devices also require regular charging to maintain power or battery levels within a desired range. A typical schedule is to recharge a mobile device during a planned period of non-use by the user, such as overnight. It is advantageous, then, to combine backup functionality with charging because synchronizing targeted data can be done during a time when the user does not plan to use the mobile device. Thus, a device that can both charge a mobile device and store backups of its data is desirable.

Another issue with backing up data is that a typical mobile device requires user intervention to initiate the backup process. This may be particularly true where the backup process is managed by a third-party application or by an application that is not provided by the manufacturer of the mobile device or the company that develops the operating system of the mobile device. It would be advantageous, then, to provide a device that can communicate with the mobile device in such a way as to bypass requirements for user intervention when backing up data.

Accordingly, described herein are memory stations that are configured to charge a mobile device, to receive data for storage from the mobile device, and to transmit a trigger signal to the mobile device responsive to the beginning of a charge cycle to initiate the backup process. In this way, the mobile device can automatically execute a backup program or application without user intervention. This advantageously solves the inconvenience of requiring user input to execute a backup program. At times, a user may even forget to provide the required input to execute the program, consequently leaving themselves without a current backup of their data. The disclosed memory stations and related methods beneficially enable seamless data backup while charging a mobile device. This can be accomplished with no user intervention to initiate the backup process.

The disclosed systems and methods include starting a backup application on a mobile device responsive to a trigger signal. The trigger signal is generated and transmitted wirelessly by a memory station responsive to the memory station detecting the beginning of a charging cycle. In some embodiments, the memory station can also generate an exit signal responsive to the memory station detecting the end of the charging cycle. A coupled mobile device can run an exit program responsive to receiving the exit signal transmitted wirelessly by the memory station. The disclosed systems and methods improve user experience by providing backup functionality without user input while charging the mobile device. In addition, by initiating the backup program after the memory station transmits a trigger signal, the backup application on the mobile device can be launched at a desirable time, e.g., a time when the user is surrendering the mobile device for a period of time to charge the device (e.g., overnight, while in a meeting, while working, or a similar period of planned non-use).

Although the principles disclosed herein may be applicable to charging and backing up mobile devices, for clarity and ease of description, certain embodiments are disclosed herein in the context of smartphones. However, it is to be understood that the disclosed systems and methods may be used to provide charging and data synchronization for battery-powered devices that store and/or generate data.

Example Embodiments of Memory Stations and Mobile Devices

FIG. 1 illustrates an example embodiment of a memory station 110 for charging and backing up data for a mobile device 120. The memory station 110 is configured to provide power to the mobile device 120 through a cable 102 and to receive data from the mobile device 120 through the cable 102 for backing up. The memory station 110 is configured to transmit a trigger signal 115 after the memory station 110 detects that the mobile device 120 is connected for charging. The trigger signal 115 causes the mobile device 120 to run a designated program or application for backing up data to the memory station 110. The trigger signal 115 and the mobile device 120 can be configured so that, responsive to receiving the trigger signal, the mobile device 120 can be configured to run the designated program without receiving input from a user and/or without any user intervention. This can advantageously simplify the process of backing up data to the memory station. Accordingly, the memory station 110 is configured to transmit the wireless trigger signal 115 to trigger an application on the mobile device 120 based on detection of a charging event (e.g., initiation of a charging cycle). The backup process can then begin automatically, without user intervention, at a time the user has surrendered the mobile device 120 for charging.

The memory station 110 includes data storage for storing data received from the mobile device 120. The memory station 110 includes a power module configured to deliver electrical power to the mobile device 120 to power and/or to charge a battery of the mobile device 120. The memory station can include an input/output port 112 that can be coupled to the cable 102. The input/output port 112 can be configured to send electrical power from the power module and to receive data from the mobile device 120 for backup purposes.

The memory station 110 includes one or more antennas configured to transmit wireless signals, including the trigger signal 115 responsive to a determination that charging has been initiated and/or terminated. The trigger signal 115 can be transmitted after initiation of the charging event (e.g., initiation of the charge cycle) and can be encoded to include information indicating that it is a trigger associated with initiation of charging. Similarly, the trigger signal 115 can be transmitted after termination of the charging event (e.g., termination of the charge cycle) and can be encoded to include information indicating that it is a trigger associated with termination of charging.

The mobile device 120 can be configured to run different programs, applications, and/or sets of computer executable instructions responsive to receiving the trigger signal 115. Responsive to the trigger signal 115 indicating initiation of a charging cycle, the mobile device 120 can run a backup program, application, or protocol that is configured to backup and/or synchronize data by sending data to the memory station 110. Responsive to the trigger signal 115 indicating termination of the charging cycle, the mobile device 120 can run an exit program, application, or protocol that is configured to display status information related to the backup process.

The mobile device 120 can be a smartphone, a tablet, a handheld device, or the like, and can include control circuitry having one or more central processing units (CPUs), memory/data storage devices or modules, network interfaces, input/output interface components, and the like. The control circuitry of the mobile device 120 may be implemented to perform the functionality described herein. The control circuitry of the mobile device 120 may be configured to execute certain software applications for implementing the functionality described herein. The mobile device 120 can include one or more local storage devices, such as hard disks, flash memory modules, and the like.

The memory station 110 includes a housing 114 wherein data storage, control circuitry, antennas, and other modules are housed. The housing 114 encloses the electrical components as well as provides a platform 116 on which the mobile device 120 can be supported during charging and/or backing up. The housing 114 forms the input/output port 112 to which the cable 102 can be connected to provide power and data transfer.

A typical scenario for using the memory station 110 with the mobile device 120 includes a user connecting the cable 102 from the memory station 110 to the mobile device 120. Optionally, the user can place the mobile device 120 on the platform 116 during charging. The memory station 110 detects initiation of a charging cycle, and, in response, transmits the trigger signal 115. The mobile device 120 receives the trigger signal 115, and, in response, executes a backup application that transfers data to the memory station 110.

Figure 2:
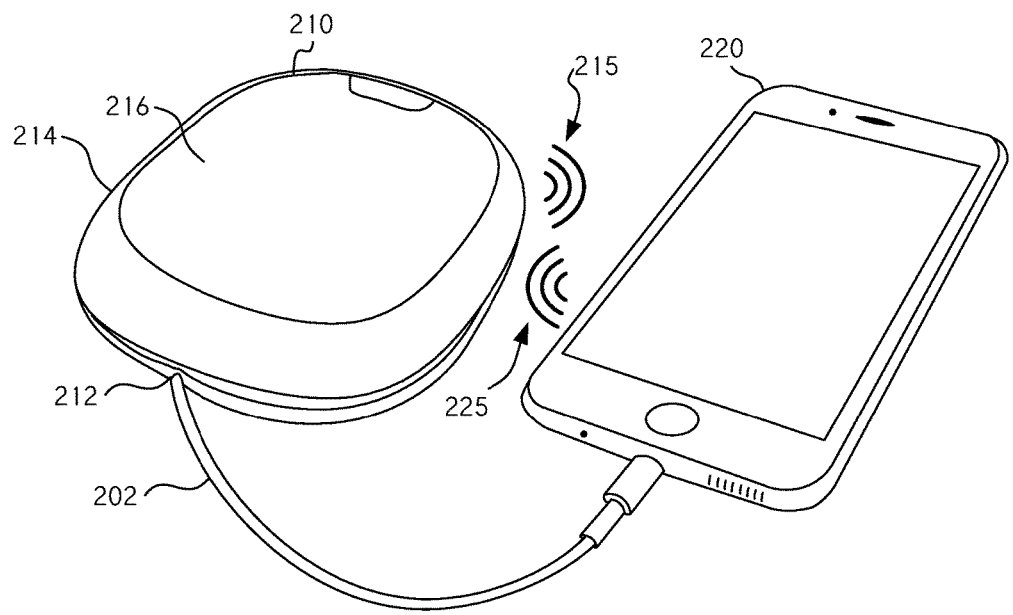
FIG. 2 illustrates another example embodiment of a memory station for charging and wirelessly backing up data for a mobile device.

FIG. 2 illustrates another example embodiment of a memory station 210 for charging and wirelessly backing up data for a mobile device 220. The memory station 210 is similar to the memory station 110 described herein with reference to FIG. 1, except that the memory station 210 is configured to wirelessly receive data from the mobile device 220. The memory station 210 can be configured to transmit a trigger signal 215 in response to a charging event using a first wireless communication protocol and to receive data 225 from the mobile device 220 using a second wireless communication protocol. The memory station 210 can be configured to transfer power to the mobile device 220 through the cable 202 that is coupled to a charging port 212 of the memory station 210. The memory station 210 can be configured to simultaneously charge the mobile device 220 using the cable 202 and to back up data from the mobile device 220 using wireless communication.

In some embodiments, the memory station 210 is configured to transmit data to the mobile device 220 using the same wireless communication protocol that is used to transfer data 225 from the mobile device 220. In some implementations, the wireless communication protocol that is used to transfer data 225 from the mobile device 220 is different from the wireless communication protocol used for the trigger signal 215. In certain implementations, the wireless communication protocol that is used to transfer data 225 from the mobile device 220 is the same as the wireless communication protocol used for the trigger signal 215. In some embodiments, the memory station 210 can communicate with the mobile device 220 using the cable 202. In some implementations, communication over the cable 202 can be in addition to any other wireless communication from the memory station 210 to the mobile device 220.

The memory station 210 includes a housing 214 that is configured to enclose and/or otherwise support data storage, control circuitry, and antennas. The housing 214 forms the charging port 212 that is configured to couple to the cable 202. The housing includes a platform 216 to optionally support the mobile device 220 during charging and backing up.

A typical scenario for using the memory station 210 with the mobile device 220 includes a user connecting the cable 202 from the memory station 210 to the mobile device 220.

Optionally, the user can place the mobile device 220 on the platform 216 during charging. The memory station 210 detects initiation of a charging cycle, and, in response, transmits the trigger signal 215. The mobile device 220 receives the trigger signal 215, and, in response, executes a backup application that wirelessly transfers data 225 to the memory station 210.

Figure 3:
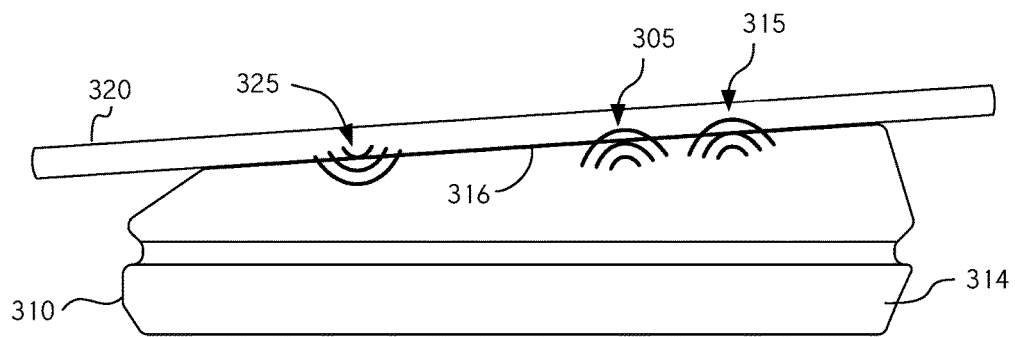
FIG. 3 illustrates another example embodiment of a memory station for wirelessly charging and wirelessly backing up data for a mobile device.

FIG. 3 illustrates another example embodiment of a memory station 310 for wireless charging and wirelessly backing up data for a mobile device 320. The memory station 310 is similar to the memory station 110 described herein with reference to FIG. 1, except that the memory station 310 is configured to wirelessly receive data 325 from the mobile device 320. In addition, the memory station 310 is similar to the memory station 210 described herein with reference to FIG. 2, except that the memory station 310 is configured to wirelessly transmit electrical power 305 to the mobile device 320 to recharge its battery. The memory station 310 can be configured to transmit a trigger signal 315 in response to a charging event using a first wireless communication protocol, to receive data 325 from the mobile device 320 using a second wireless communication protocol, and to charge the mobile device 320 by wirelessly transferring electrical power 305 (e.g., through wireless induction). The memory station 310 can be configured to simultaneously charge the mobile device 320 using wireless charging technologies and to back up data 325 from the mobile device 320 using wireless communication.

In some embodiments, the memory station 310 is configured to transmit data to the mobile device 320 using the same wireless communication protocol that is used to transfer data 325 from the mobile device 320. In some implementations, the wireless communication protocol that is used to transfer data 325 from the mobile device 320 is different from the wireless communication protocol used for the trigger signal 315. In certain implementations, the wireless communication protocol that is used to transfer data 325 from the mobile device 320 is the same as the wireless communication protocol used for the trigger signal 315.

The memory station 310 includes a housing 314 that is configured to enclose or otherwise support data storage, control circuitry, and antennas. The housing includes a platform 316 to support the mobile device 320 during charging and backing up. In some embodiments, placing the mobile device 320 on the platform 316 positions the mobile device 320 in such a way as to initiate and sustain wireless charging 305. For example, the housing 314 can include a wireless transmitter that includes an electromagnetic emitting portion configured to transfer electrical power to a wireless receiver of the mobile device 320. When the mobile device 320 is positioned on the platform 316, the electromagnetic emitting portion of the wireless transmitter housed in the memory station 310 can be sufficiently aligned with the wireless receiver of the mobile device 320 so that wireless power 305 is transferred to the mobile device 320. In this way, when a user positions the mobile device 320 on the platform 316, charging can automatically begin as well as data backup due at least in part to the trigger signal 315 transmitted by the memory station 310. This can be particularly advantageous in facilitating the process of charging and backing up the mobile device 320 from the standpoint of a user.

A typical scenario for using the memory station 310 with the mobile device 320 includes a user placing the mobile device 320 on the platform 316 of the memory station 310. The memory station 310 initiates a charging cycle by wirelessly transferring power 305 to the mobile device 320. The memory station 310 detects initiation of the charging cycle, and, in response, transmits the trigger signal 315. The mobile device 320 receives the trigger signal 315, and, in response, executes a backup application that wirelessly transfers data 325 to the memory station 310.

For each of the example embodiments illustrated in FIGS. 1, 2, and 3, the memory station is coupled to the mobile device. The memory station is power coupled to the mobile device where the memory station can deliver electrical power to the mobile device, either using a cable or using wireless charging technologies. The memory station is communicably coupled to the mobile device where the mobile device can transmit data to the memory station, either using a cable or using wireless communication protocols. Accordingly, the memory station can be power coupled and/or communicably coupled to the mobile device whether or not there is a cable physically connected between the mobile device and the memory station.

Example Functionality of Memory Stations and Mobile Devices

Figure 4A:
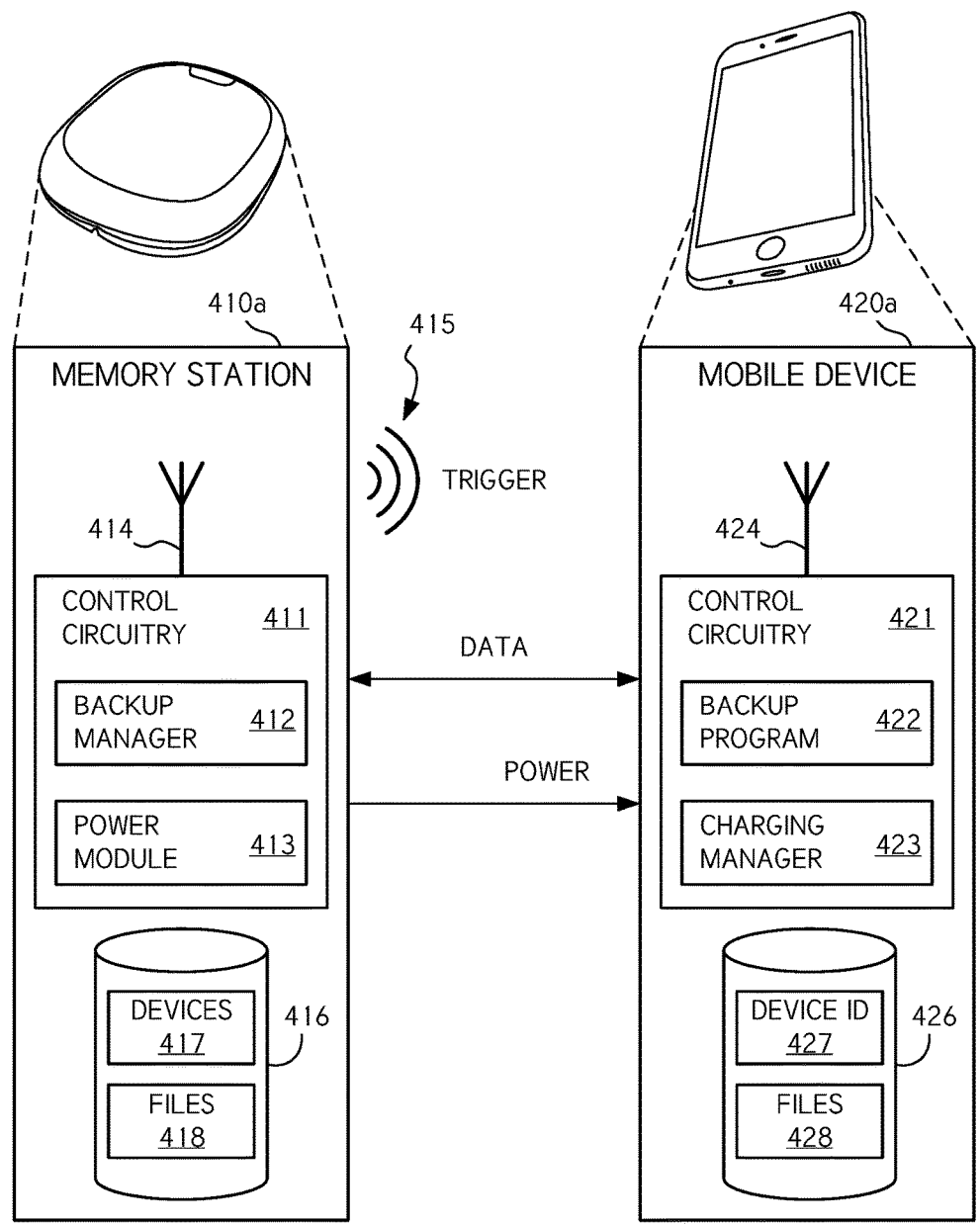
FIGS. 4A, 4B, and 4C illustrate block diagrams of example memory stations and mobile devices illustrating components that provide charging and backup functionality.

FIG. 4A illustrates a block diagram of an example memory station 410a and a mobile device 420a, each with control circuitry and components to provide data backup and charging. The memory station 410a is configured to provide file-based, or object-based, data storage services to the mobile device 420a. These data storage services can be used to synchronize data from the mobile device 420a, to back up data from the mobile device 420a, to restore stored data to a mobile device 420a, and/or to transfer stored data to a mobile device 420a. The memory station 410a is configured to transmit a trigger signal 415 responsive to detection of a charging event. In response to receiving the trigger signal 415, the mobile device 420a is configured to initiate data transfer between the memory station 410a and the mobile device 420a.

An operating system may be implemented in the memory station 410a by a control circuitry 411 thereof. The memory station 410a can be configured to store files from one or more mobile devices, such as the mobile device 420a. The memory station 410a can be configured to provide access to files 418 to the mobile device 420a using one or more file-sharing protocols. The memory station 410a includes data store 416 for storing device identifiers 417 for one or more mobile devices, each device identifier uniquely identifying a mobile device. The data store 416 can include one or more non-volatile memory devices or modules, and can include any type of data storage media (e.g., solid-state, magnetic).

The memory station 410a is configured to transmit a trigger signal 415 using the control circuitry 411 that is operably coupled to an antenna 414. Responsive to determining initiation and/or termination of a charging event, the control circuitry 411 controls the antenna 414 and associated circuitry to generate and to transmit the trigger signal 415.

The memory station 410a includes a non-volatile memory module such as the data storage module 416 and control circuitry 411 coupled to the non-volatile memory module. The control circuitry 411 is configured to manage synchronization and backing up of data from the mobile device 420a using a backup manager 412. The control circuitry 112 is further configured to manage the transfer of electrical power for charging the mobile device 420a using a power module 413. Although the control circuitry 112 is illustrated as separate modules, it should be understood that the functionality represented thereby may be implemented using any configuration of modules or control circuitry.

In some embodiments, the non-volatile memory module 416 includes computer executable instructions configured to execute one or more methods or processes (or portions of such processes and methods) described herein. In certain embodiments, the control circuitry 411 is configured to execute computer executable instructions stored on the memory station 410a, the computer executable instructions configured to perform one or more of the processes or methods (or portions of such processes and methods) described herein. In some implementations, the backup manager 412 includes computer executable instructions configured to receive data from the mobile device 420a and to store the received data with the files 418 in the non-volatile memory module 416. In various implementations, the power module 413 includes computer executable instructions configured to detect a connection of a mobile device for charging, to determine initiation of a charging event, to determine termination of the charging event, and/or to detect a disconnection of a mobile device from charging. In various implementations, the backup manager 412 and/or the power module 413 include a combination of software, firmware, and/or hardware configured to perform the processes described herein.

The backup manager 412 is configured to receive data from the mobile device 420 and directed to the non-volatile memory module 416 to store as files 418. The backup manager 412 can be configured to receive backup information from the mobile device 420a, the backup information associated with information about the mobile device 420a, the data to be stored, and/or information about one or more previous backup sessions. Backup information can include, for example and without limitation, a mobile device identifier, a quantity of data to be stored during the backup session, the last time a successful backup was performed, the last time a partial backup was performed, a flag indicating that a backup session is to be resumed, and the like. The backup manager 412 can store backup information in the non-volatile memory module 416. For example, the backup manager 412 can store the mobile device identifier in the devices 417. This can enable, for example, tracking of devices and data from devices so that the memory station 410a can manage backing up multiple mobile devices. The backup manager 412 can be configured to be communicably or operably coupled to the power module 413. In some embodiments, the backup manager 412 can be configured to determine where to store files received from the mobile device 420a, whether files received from the mobile device are already stored in the files 418, and/or whether a file received from the mobile device 420a is identical to an existing file in the files 418. In this way, the backup manager 412 can be configured to efficiently back up data from the mobile device 420a.

The power module 413 is configured to detect initiation and termination of a charging cycle, to transfer electrical power to a connected mobile device, and/or to communicate with the control circuitry 411 regarding the status of a charging cycle. The power module 413 can include a transformer configured to receive a 1st voltage and converted into a 2nd voltage suitable for charging the mobile device 420a. The power module 413 can include circuitry configured to convert electrical power received from an external source, such as an electrical outlet, to a current and/or voltage suitable for charging the mobile device 420a. The power module 413 can include a battery or other voltage source that can be used to provide electrical power for charging the mobile device 420a.

The power module 413 can interface with the cable through an input/output port electrically coupled to the power module 413. The power module 413 can provide electrical power to the mobile device 420a through the cable. The power module 413 can be configured to detect the flow of electrical power (e.g., the flow of electrical current and/or a change in voltage) when charging the mobile device 420a. In some embodiments, the power module 413 is configured to detect a voltage change when a mobile device is connected using the cable.

In some embodiments, the power module 413 can communicate with the control circuitry 411 to indicate that a charging cycle has begun responsive to detecting or determining that power is flowing through the cable or out of the input/output port. Similarly, in various embodiments, the power module 413 can communicate with the control circuitry 411 to indicate that a charging cycle has terminated responsive to detecting or determining that power has stopped flowing through the cable or out of the input/output port. In some embodiments, the power module 413 is configured to detect a change in voltage at the input/output port and to indicate to the control circuitry 411 that a charging cycle has initiated or terminated based on that detection. Similarly, in certain embodiments, the power module 413 is configured to detect a change in a flow of current at the input/output port and to indicate to the control circuitry 411 that a charging cycle has initiated or terminated based on that detection.

For example, a pin of the input/output port can be monitored to detect a voltage thereon. A change in that voltage can indicate to the power module 413 that a mobile device has been coupled to the memory station 410a for charging or that mobile device has been disconnected from the memory station 410a. Responsive to this change, the memory station 410a can indicate to the control circuitry that a charging cycle has initiated or terminated.

The control circuitry 411 is operably coupled to the antenna 414 and can be configured to send wireless signals (e.g., radio frequency (RF) signals, microwave signals, and/or infrared signals) using the antenna 414. The control circuitry 411 is configured to communicate wirelessly using one or more wireless communication protocols. For example, the trigger signal 415 can be transmitted using the antenna 414 where the trigger signal 415 is modulated using a particular wireless communication protocol. The wireless communication protocol can include, for example and without limitation, wireless personal area network technologies (e.g., BLUETOOTH, BLUETOOTH low-energy (BLE), APPLE iBeacon, etc.), wireless local area network technologies (e.g., IEEE 802.11a/b/g/n/ac or Wi-Fi), near field communication (NFC), and the like.

The control circuitry 411 can receive an indication from the power module 413 indicating the status of a charging cycle (e.g., initiation or termination). In response, the control circuitry 411 can transmit the trigger signal 415 using the antenna 414. In some embodiments, the power module 413 is configured to use the antenna 414 to transmit the trigger signal 415. This can be done, for example, responsive to the power module 413 determining the status of a charging cycle. As used herein, a charging cycle includes but is not limited to a period of time during which power is transferred from the memory station 410a to the mobile device 420a. In addition, a charging cycle can include any period of time during which the mobile device 420a is power and/or communicably coupled to the memory station 410a using a cable that is capable of transferring power.

In some embodiments, the trigger signal 415 can encode in the signal information about the charging cycle. For example, the trigger signal 415 can encode information as to whether the charging cycle is initiating or terminating. As used herein, the trigger signal 415 can refer to a signal sent responsive to initiation of a charge cycle or termination of a charging cycle. However, in some instances, the trigger signal 415 may be referred to as an exit signal to specifically indicate termination of a charging cycle.

Accordingly, the memory station 410a includes the power module 413 that is configured to provide electrical power to a coupled mobile device 420a. The memory station 410a includes the antenna 414 configured to transmit wireless signals corresponding to a particular wireless communication protocol. The memory station 410a includes the non-volatile memory module 416 and control circuitry 411 coupled to the antenna 414, the power module 413, and the non-volatile memory module 413. The control circuitry 411 is configured to detect initiation of a charging cycle (e.g., using the power module 413). Detecting initiation and/or termination of a charging cycle can include detecting changes in current, voltage, and/or power provided by the power module 413. For example, where the current, voltage, and/or power provided by the power module 413 increases over a threshold, the control circuitry 411 can determine that a charging cycle has initiated. Similarly, where the current, voltage, and/or power provided by the power module 413 changes so that the change over time is greater than or equal to a threshold rate of change, the control circuitry 411 can determine that a charging cycle has initiated. As another example, where the current, voltage, and/or power provided by the power module 413 decreases below a threshold, the control circuitry 411 can determine that a charging cycle has terminated. Similarly, where the current, voltage, and/or power provided by the power module 413 changes so that the change over time is less than or equal to a threshold rate of change (e.g., a negative rate of change), the control circuitry 411 can determine that a charging cycle has terminated.

The control circuitry 411 is also configured to transmit, through the antenna 414, the trigger signal 415 using the particular wireless communication protocol. The control circuitry 411 is also configured to receive, from the coupled mobile device 420a, backup information. The control circuitry 411 is also configured to receive, from the coupled mobile device 420a, data for storage on the non-volatile memory module 416. The control circuitry 411 is also configured to store the received data in a location on the non-volatile memory module 416 that corresponds to the coupled mobile device 420a.

In some embodiments, the trigger signal 415 is transmitted after a period of time has elapsed from initiation of the charging cycle. Such a delayed trigger signal 415 can be configured to increase the likelihood that the mobile device 420a is being surrendered by the user for an appreciable period of time. For example, the trigger signal can be delayed for at least 1 minute, at least 2 minutes, at least 3 minutes, at least 4 minutes, at least 5 minutes, at least 10 minutes, or at least 15 minutes. The length of the delay between determining the initiation of a charging cycle and transmission of the trigger signal 415 can be configured so that the likelihood is relatively high that the mobile device 420a has been surrendered for charging. In some embodiments, the trigger signal 415 is configured to wake up or otherwise activate the mobile device 420a. In this way, charging and data backup or synchronization can be advantageously correlated in time.

In some embodiments, the trigger signal 415 is transmitted when one or more criteria or conditions are satisfied. Such a smart trigger signal 415 can be configured to increase the likelihood that the mobile device 420a is being surrendered by the user for an appreciable period of time. For example, the trigger signal 415 can be transmitted after initiation of a charging cycle and between predetermined hours of the day (e.g., after 8 PM and/or before 6 AM). In some embodiments, criteria for transmission of the trigger signal 415 can adapt over time based at least in part on conditions related to previous charging cycles. For example, if charging occurs at a regular time than the trigger signal 415 can be transmitted if a charging cycle initiates at or near that regular time.

The trigger signal 415 is an exit trigger when the charging cycle terminates. This may occur, for example, when data or power conductivity is lost (e.g., when the power/data cable has been disconnected). Responsive to the exit signal, the mobile device 420a can initiate an exit program, as described herein.

The memory station 410a can be configured to charge and back up data for a plurality of mobile devices. The non-volatile memory module 416 includes identifiers for mobile devices (e.g., devices 417). In such embodiments, the memory station 410a can be configured to transmit the trigger signal 415 with embedded information correlated to a particular mobile device. In this way, the memory station 410a can control which mobile device backs up data to the non-volatile memory module 416 and/or the order in which mobile devices transfer data for backup purposes. The backup manager 412 can be configured to determine an order for receiving data from the plurality of connected mobile devices. The backup manager 412 can include a decision mechanism to decide which device can transmit or transfer data. In some embodiments, when a new device is connected to the memory station 410a, the backup manager 412 sends the trigger signal 415 for the newly connected device when the backup manager 412 is ready to receive data from that device. This can be done so that only one device is transferring data to the memory station 410a at a time. The trigger signal 415 for the newly connected device can thus be delayed in time relative to initiation of the charging cycle for the device. This delay can vary (e.g., not be a predetermined amount of time) and it can be related to termination of a charging cycle of a previously connected device and/or termination of backing up of data from a previously connected device. The backup manager 412 can determine the order of data synchronization or backup based at least in part on the amount of data for backup, battery status of the mobile devices, a backup history of that mobile device, etc. The backup manager 412 can also direct files received for backup to locations on the non-volatile memory module 416 that correspond to the device (e.g., using a device identifier received from a mobile device). In some embodiments, the location corresponds to a folder that is named based on the mobile device identifier.

Accordingly, the memory station 410a can include the power module 413 configured to provide electrical power to a plurality of coupled mobile devices. The memory station 410a includes the antenna 414 configured to transmit wireless signals corresponding to a particular wireless communication protocol. The memory station 410a includes the non-volatile memory module 416 and control circuitry 411 coupled to the antenna 414, the power module 413, and the non-volatile memory module 416. The control circuitry is configured to detect initiation of individual charging cycles for individual mobile devices of the plurality of coupled mobile devices. The control circuitry 411 is also configured to transmit, through the antenna 414, the trigger signal 415 to the plurality of coupled mobile devices using the particular wireless communication protocol. The control circuitry 411 is also configured to receive, from the plurality of coupled mobile devices, backup information. The control circuitry 411 is also configured to determine an order of backup based at least in part on the received backup information. The control circuitry 411 is also configured to receive, from a first coupled mobile device, first data for storage on the non-volatile memory module 416. The control circuitry 411 is also configured to store the received first data in a first location on the non-volatile memory module 416 that corresponds to the first coupled mobile device. The control circuitry 411 is also configured to receive, from a second coupled mobile device, second data for storage on the non-volatile memory module 416. The control circuitry 411 is also configured to store the received second data in a second location on the non-volatile memory module 416 that corresponds to the second coupled mobile device, wherein the first data is received prior to the second data based on the determined order of backup.

In some embodiments, the control circuitry 411 is further configured to detect a second charging cycle corresponding to a second coupled mobile device. Where the second charging cycle at least partially overlaps the first charging cycle, the backup manager 412 is configured to determine an order for receiving data for storage from the newly coupled mobile device and the second coupled mobile device. The backup information can include a mobile device identifier for each of the coupled mobile devices and the newly coupled mobile device. The backup information can also include a quantity of data for storage for each of the coupled mobile devices and the newly coupled mobile device. The control circuitry can be configured to determine the order of backup based at least in part on the quantity of data for storage. The control circuitry 411 can be configured to receive data and to store the received data for a first designated mobile device prior to a second designated mobile device based on the determined order. The location on the non-volatile memory module 416 where the received data is stored can correspond to the device identifier.

In some embodiments, the trigger signal 415 can be a device-specific trigger. For example, the trigger signal 415 can encode information that indicates a targeted mobile device. The information can include a device identifier or other information associated with a mobile device. The device-specific trigger signal 415 can be transmitted at a time when the memory station 410*a* is prepared to receive data for backup from the mobile device. The mobile device 420*a* can communicate with the memory station 410*a* to transfer a device identifier and to indicate that the mobile device 420*a* is connected for charging. Data from the mobile device 420*a* is directed to a folder corresponding to the mobile device 420*a* and data from other mobile devices is directed to other folders.

Accordingly, the memory station 410*a* is configured to transmit the trigger signal 415 at a time when it is likely that the mobile device 420*a* is coupled for charging. Transmission of the trigger signal 415 can initiate the backup process on the mobile device 420*a*, as described herein. In this way, the disclosed memory stations detect when charging initiates and initiates backup at that time. This is in contrast to systems where it is the mobile device that determines initiation and/or termination of the charging cycle for deciding when to send data for backup to an external storage system (e.g., a local storage device or a cloud-based storage system).

The mobile device 420*a* includes a backup program 422 and a charging manager 423. Similar to the memory station 410*a*, the mobile device 420*a* can include a non-volatile memory module 426 and control circuitry 421 coupled to the non-volatile memory module 426. The control circuitry 421 can be configured to transfer data for backup using the backup program 422 and to manage charging of a battery using the charging manager 423. Although the control circuitry 421 of the mobile device 420*a* is described and illustrated as separate modules, it should be understood that the functionality represented thereby may be implemented using any configuration of modules or control circuitry.

In some embodiments, the non-volatile memory module 426 of the mobile device 420*a* includes computer executable instructions configured to execute one or more methods or processes (or portions of such processes and methods) described herein. In certain embodiments, the control circuitry 421 is configured to execute computer executable instructions stored on the mobile device 420*a*, the computer executable instructions configured to perform one or more of the processes or methods (or portions of such processes and methods) described herein. In some implementations, the backup program 422 includes computer executable instructions configured to determine data for backup from the files 428 stored on the non-volatile memory module 426, to interpret or decode the trigger signal 415 received from the memory station 410*a*, to transmit backup information to the memory station 410*a*, and/or to execute an exit program upon receiving an exit signal from the memory station 410*a*. In various implementations, the charging manager 423 includes computer executable instructions configured to regulate the power received from the memory station 410*a* and/or regulate the power delivered to the battery for charging. In various implementations, the backup program 422 and/or the charging manager 423 include a combination of software, firmware, and/or hardware configured to perform the processes described herein.

The backup program 422 is configured to monitor for the trigger signal 415 using an antenna 424. Responsive to the trigger signal 415, the backup program 422 is configured to synchronize and/or back up data from the files 428 on the non-volatile memory module 426. The backup program 422 can detect the trigger signal 415 and initiate the backup process without user intervention. The backup program 422 is configured to communicate to the memory station 410*a* data to back up. This communication can be accomplished using the same cable that is used to transfer power to the mobile device 420*a*.

The backup program 422 is configured to transfer backup information to the memory station 410*a* responsive to detecting and/or receiving the trigger signal 415 from the memory station 410*a*. The backup information can include, for example and without limitation, device identifier (ID) 427, a quantity of data to be backed up, a time of last backup, a request to resume a previous or partial backup, etc.

The charging manager 423 is configured to receive electrical power from the memory station 410*a* and to direct it to a rechargeable power source (e.g., a battery). The charging manager 423 includes electrical components configured to manage the transfer and direction of electrical power. For example, the charging manager 423 can include transformers, capacitors, switches, transistors, and the like to manage the power received from the memory station 410*a*. The charging manager 423 also includes an electrical port that is configured to couple with the cable attached between the memory station 410a and the mobile device 420a. The charging manager 423 can be configured to limit or otherwise change the amount of electrical power from the memory station 410a to comply with specifications, to trickle charge the rechargeable power source, to cease charging the power source, and/or to power the mobile device 420a using the power from the memory station 410a.

In some embodiments, the mobile device 420a is not configured to start the backup process using the backup program 422 in response to initiation of the charging cycle, rather, the mobile device 420a is configured to start the backup process in response to receiving the trigger signal 415. In some implementations, the backup process initiates only in response to a trigger signal 415 directed to the mobile device having the device ID 427 included or encoded in the trigger signal 415.

The control circuitry 421 is operably coupled to the antenna 424 and can be configured to receive wireless signals (e.g., radio frequency (RF) signals, microwave signals, and/or infrared signals) using the antenna 424. The control circuitry 421 is configured to communicate wirelessly using one or more wireless communication protocols, as described herein with reference to the antenna 414. The antenna 424 receives the trigger signal 415 that is transmitted by the memory station 410a responsive to the power module 413 determining initiation or termination of a charging cycle. As used herein, a charging cycle includes but is not limited to a period of time during which power is transferred from the memory station 410a to the mobile device 420a. In addition, a charging cycle can include any period of time during which the mobile device 420a is communicably coupled to the memory station 410a using a cable that is capable of transferring power. As used herein, the trigger signal 415 can refer to a signal sent responsive to initiation of a charge cycle or termination of a charging cycle. However, in some instances, the trigger signal 415 may be referred to as an exit signal to specifically indicate termination of a charging cycle.

The control circuitry 421 can be configured to receive, through the antenna 424, the trigger signal 415 corresponding to an exit signal. The control circuitry 421 is further configured to initiate, responsive to the received exit signal, an exit program that is part of the backup program 422. The exit program is configured to perform one or more actions responsive to termination of charging. The one or more actions include, for example and without limitation, display status related to data transmitted to the memory station, a quantity of data backed up, whether the backup process was successful, etc.

Accordingly, the mobile device 420a includes the antenna 424 configured to receive RF signals corresponding to a particular wireless communication protocol. The control circuitry 421 is coupled to the antenna 424 and the non-volatile memory module 426 and is configured to receive electrical power from the memory station 410a, which is managed by the charging manager 423. The control circuitry 421 is configured to receive the trigger signal 415 transmitted wirelessly from the memory station 410a through the antenna 424 using the particular wireless communication protocol. The control circuitry 421 is configured to initiate, responsive to the received trigger signal 415, the backup program 422 that manages data for backing up on the memory station 410a. The control circuitry 421 is configured to transmit, to the memory station 410a, backup information that includes the device ID 427 and a quantity of data to be backed up. The control circuitry 421 is configured to transmit, to the memory station 410a, data to be backed up.

In this way, the memory station 410a and the mobile device 420a are configured to start the backup process responsive to the memory station 410a determining that a charging cycle has initiated. This determination causes the memory station 410a to transmit the trigger 415 which in turn causes the mobile device 420a to run the backup program 422. The backup program 422 manages the transfer of data to the memory station 410a.

Figure 4B:
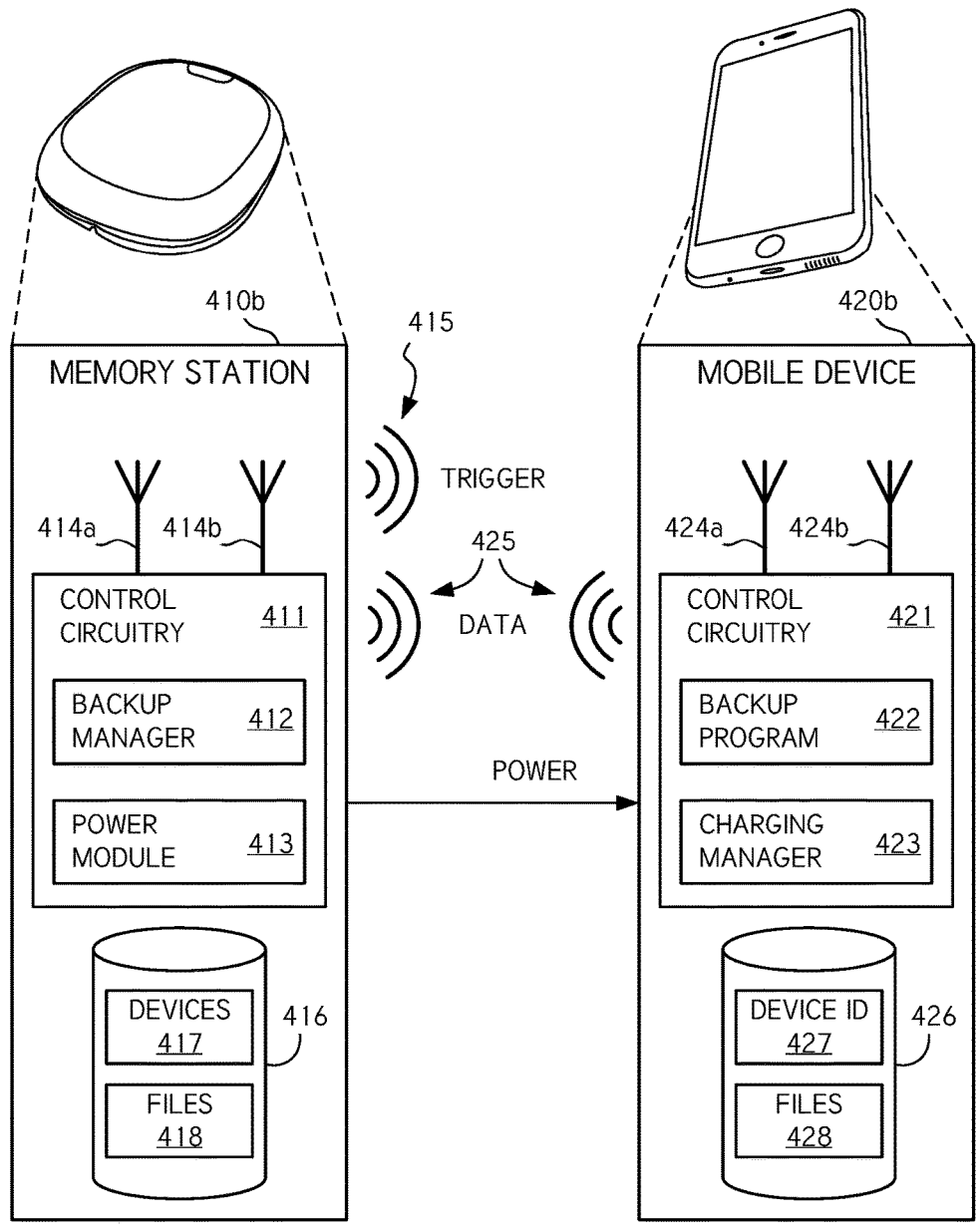

FIG. 4B illustrates a block diagram of an example memory station 410b and a mobile device 420b, each with control circuitry and components to provide wireless data backup and charging. The memory station 410b includes first and second antennas 414a, 414b configured to communicate using at least two wireless communication protocols. Although illustrated as two separate antennas, the first and second antennas 414a, 414b can be implemented as a single physical antenna that is configured to communicate using the at least two communication protocols. In some embodiments, the antennas 414a, 414b are configured to transmit and to receive RF signals corresponding to a plurality of wireless communication protocols.

The memory station 410b is configured similarly to the memory station 410a described herein with reference to FIG. 4A, so a description of common components and features will not be repeated here. The memory station 410b is configured to receive data 425 from the mobile device 420b wirelessly rather than using the cable used to transfer power between the memory station 410b and the mobile device 420b. In some embodiments, the memory station 410b is configured to receive data 425 wirelessly as well as to receive data from the mobile device 420b using a cable connected between the memory station 410b and the mobile device 420b.

The memory station 410b includes the second antenna 414b that is configured to transmit and to receive RF signals corresponding to a second wireless communication protocol different from a first wireless communication protocol that is used to transmit the trigger signal 415. The memory station 410b includes control circuitry 411 that is configured to receive the data 425 for storage using the second antenna 414b. The first antenna 414a can be further configured to transmit wireless signals corresponding to the second wireless communication protocol. The memory station 410b can be configured to receive the data 425 for storage using the second wireless communication protocol that can be received using the first antenna 414a, the second antenna 414b, or a combination of both antennas 414a, 414b.

The mobile device 420b includes a second antenna 424b configured to transmit RF signals corresponding to the second wireless communication protocol that is different from the first wireless communication protocol. The mobile device 420b is configured to transmit the data 425 to be backed up using the second antenna 424b. The mobile device 420b can be configured so that the first antenna 424a is further configured to transmit wireless signals corresponding to the second wireless communication protocol. The mobile device 420b can be configured to transmit the data 425 to be backed up using the second wireless communication protocol that can be transmitted using the first antenna 424a, the second antenna 424b, or a combination of both antennas 424a, 424b.

Figure 4C:
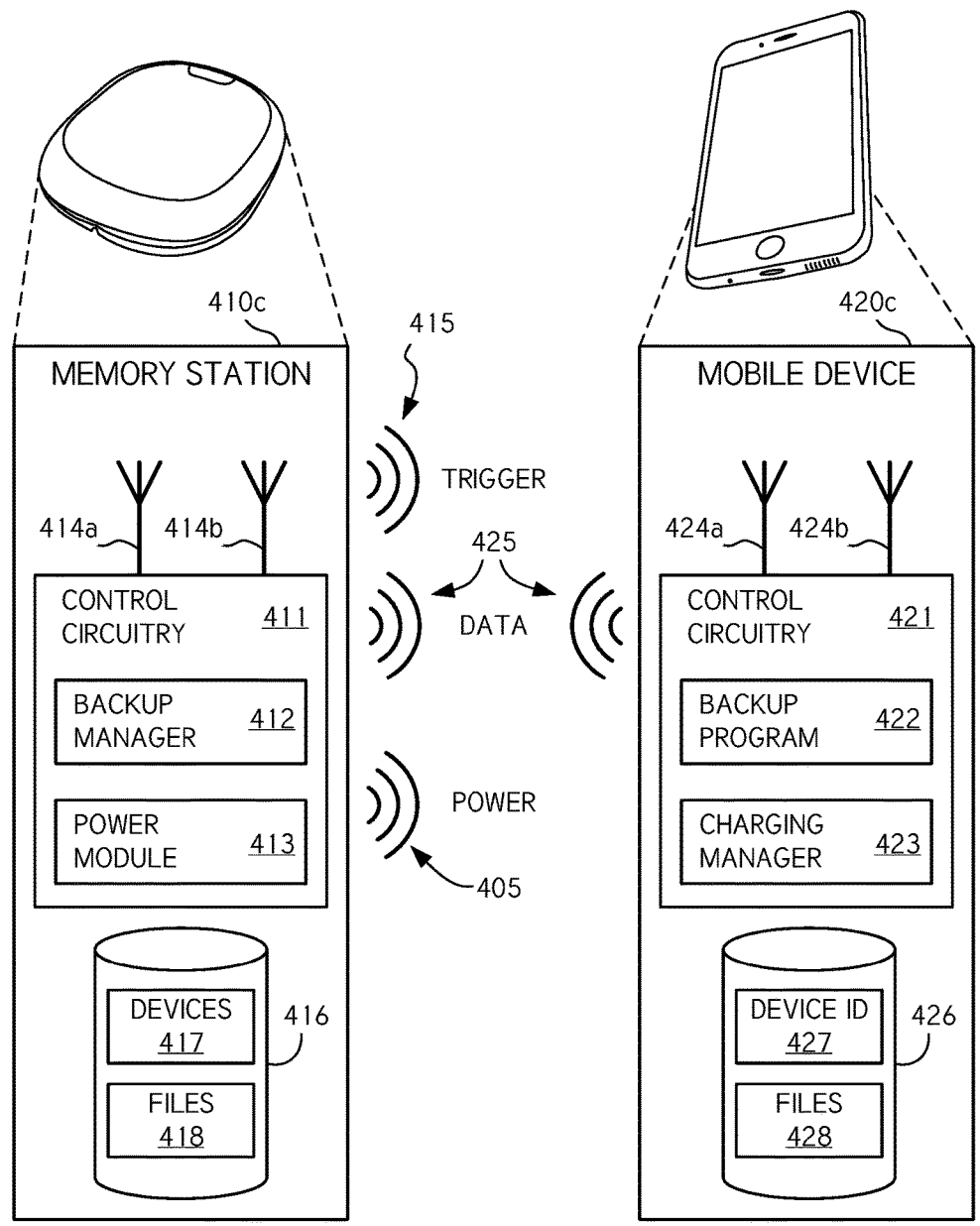

FIG. 4C illustrates a block diagram of an example memory station 410c and a mobile device 420c, each with control circuitry and components to provide wireless data backup and wireless charging. The wireless data 425 is communicated as described herein with respect to FIG. 4B. In addition, the memory station 410c and the mobile device 420c are configured similarly to the memory station 410a and the mobile device 420a and to the to the memory station 410b and the mobile device 420b, described herein with reference to FIGS. 4A and 4B, respectively. Accordingly, a description of the common elements and components will not be repeated here.

The power module 413 of the memory station 410a includes a wireless transmitter that includes an electromagnetic emitting portion to transfer electrical power to a wireless receiver of the coupled mobile device. The power module 413 is configured to transmit electrical power 405 wirelessly to the mobile device 420c. The charging manager 423 of the mobile device 420c includes a wireless receiver configured to receive the electrical power 405 from the power module 413 of the memory station. In this way, the memory station 410c and the mobile device 420c can be configured to perform charging and backup processes without the use of cables interconnecting them.

For each of the example embodiments illustrated in FIGS. 4A-4C, the memory station is coupled to the mobile device or mobile devices. The memory station is power coupled to a mobile device where the memory station can deliver electrical power to the mobile device, either using a cable or using wireless charging technologies. The memory station is communicably coupled to a mobile device where the mobile device can transmit data to the memory station, either using a cable or using wireless communication protocols. Accordingly, the memory station can be power coupled and/or communicably coupled to a mobile device whether or not there is a cable physically connected between the mobile device and the memory station.

Figure 5:
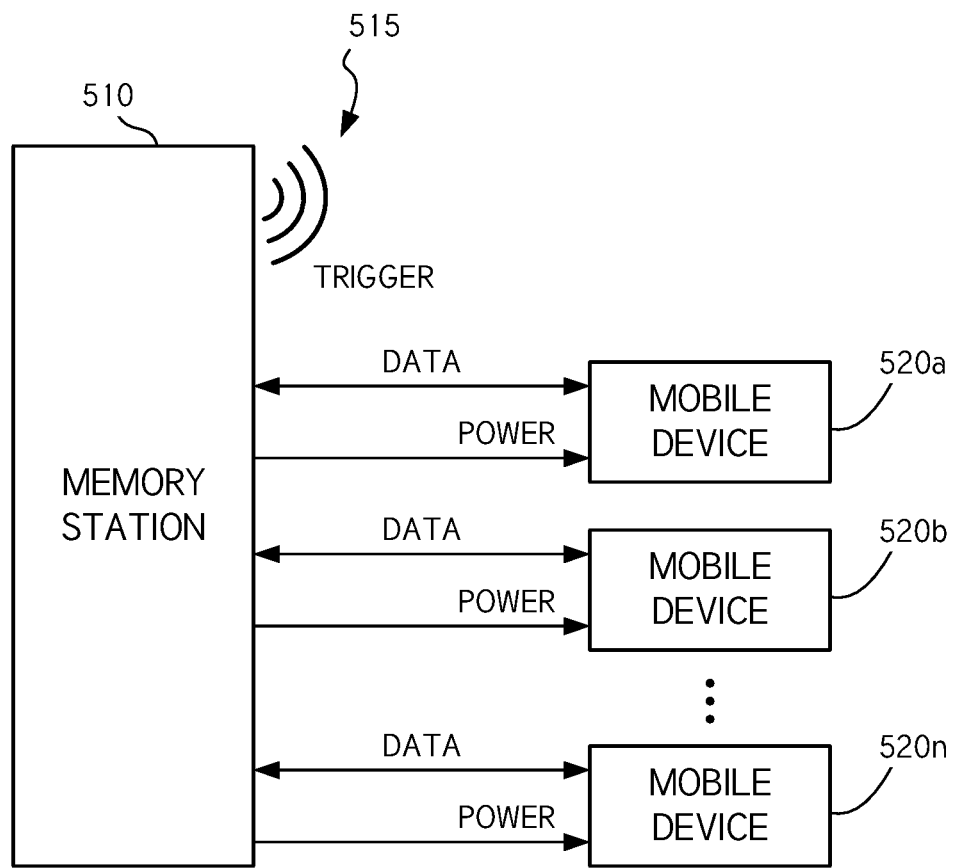
FIG. 5 illustrates a block diagram of an example memory station configured to charge and to back up multiple mobile devices connected to the memory station.

FIG. 5 illustrates a block diagram of an example memory station 510 configured to charge and to back up multiple mobile devices 520a, 520b, 520n connected to the memory station 510. The mobile devices 520a, 520b, 520n can be charged simultaneously (e.g., in parallel) or separated in time (e.g., in series). Similarly, the mobile devices 520a, 520b, 520n can back up data simultaneously (e.g., in parallel) or separated in time (e.g., in series).

The memory station 510 can be configured similarly to the memory stations described herein with respect to FIGS. 1-4C. For example, the memory station 510 can include control circuitry, an antenna coupled to the control circuitry with a backup manager and a power module, and a data store. The memory station 510 can deliver electrical power using a wired connection (e.g., a cable) or using wireless transmission. The memory station 510 can send and receive data using cables, wireless communication, or a combination of wired and wireless communication.

In some embodiments, the memory station 510 can include a non-volatile memory module that includes identifiers for mobile devices 520a, 520b, 520n. In such embodiments, the memory station 510 can be configured to transmit the trigger signal 515 with embedded information correlated to a particular mobile device. In this way, the memory station 510 can control which mobile device backs up data and/or the order in which mobile devices transfer data for backup purposes, as described herein. In certain embodiments, the memory station 510 can be configured to transmit the trigger signal 515 that is generic or applicable to each of the devices coupled to the memory station. Responsive to the trigger signal, the mobile devices 520a, 520b, 520n can transfer data to the memory station 510. Data transfer can occur using wireless communication and/or wired communication.

The memory station 510 can include a power module configured to provide electrical power to the plurality of coupled mobile devices 520a, 520b, 520n. Power can be delivered using cables or wirelessly. The control circuitry is also configured to store data received from the mobile devices 520a, 520b, 520n in appropriate and/or targeted folders.

Back Up and Charge Processes

Figure 6:
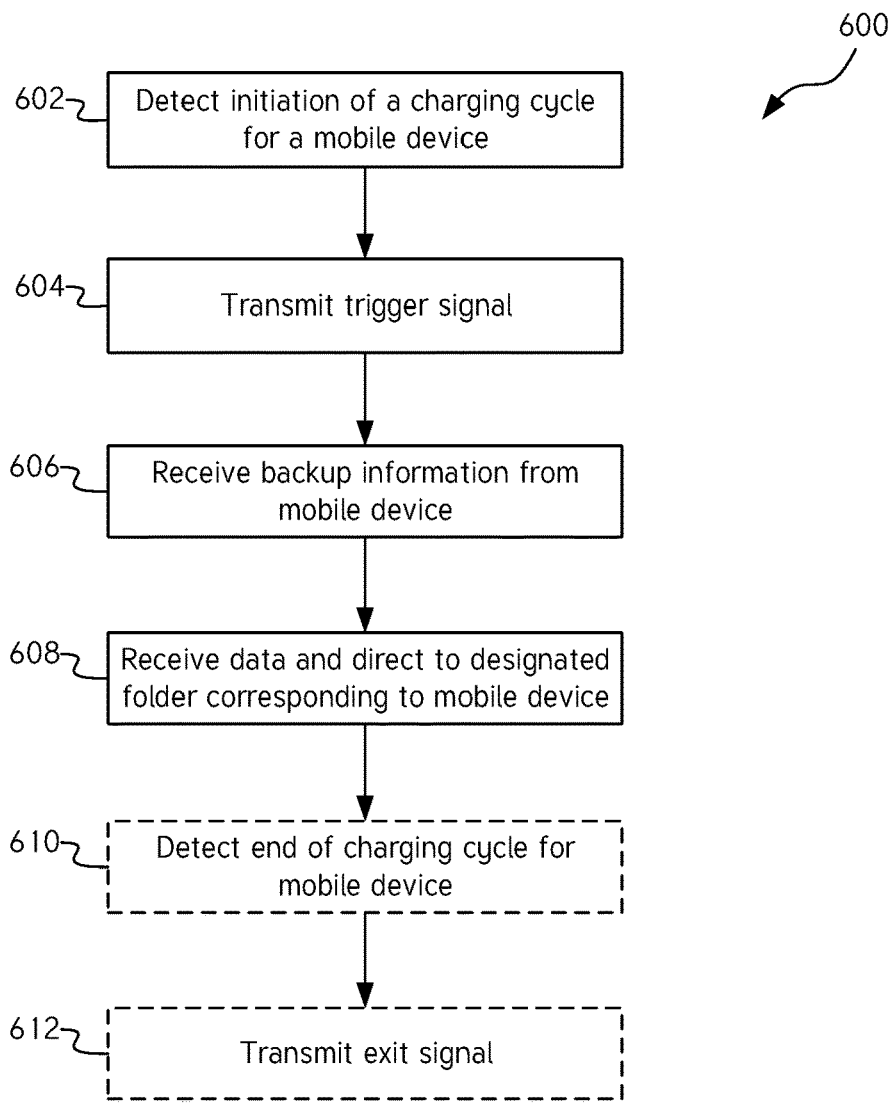
FIG. 6 illustrates a flow chart of an example process for backing up a mobile device from a memory station that provides a combination of backup storage and charging.

FIG. 6 illustrates a flow chart of an example process 600 for backing up a mobile device from a memory station that provides a combination of backup storage and charging. The process 600 may be implemented at least in part by a memory station. Accordingly, for ease of description, the process 600 is described herein as being performed by the memory station.

In block 602, the memory station detects initiation of a charging cycle for a mobile device. Detecting initiation of the charging cycle can include detecting a flow of power from the memory station. The detection of the flow of power can be a detection of a change in power flow or an increase in power flow over a threshold. Responsive to detection of the initiation of the charging cycle, the memory station transmits a trigger signal in block 604. In block 606, the memory station receives backup information from the mobile device. The backup information can include a device identifier, as described herein. In block 608, the memory station receives data from the mobile device and directs the data to a designated folder corresponding to the mobile device.

In some embodiments, the memory station is also configured to detect an end of the charging cycle for the mobile device in block 610. Detecting termination of the charging cycle can include detecting a decrease in the flow of power from the memory station. The detection of the decrease in the flow of power can be a detection of a sufficient change in power flow or a decrease in power flow below a threshold. Responsive to detecting termination of the charging cycle, the memory station transmits an exit signal in block 612.

Figure 7:
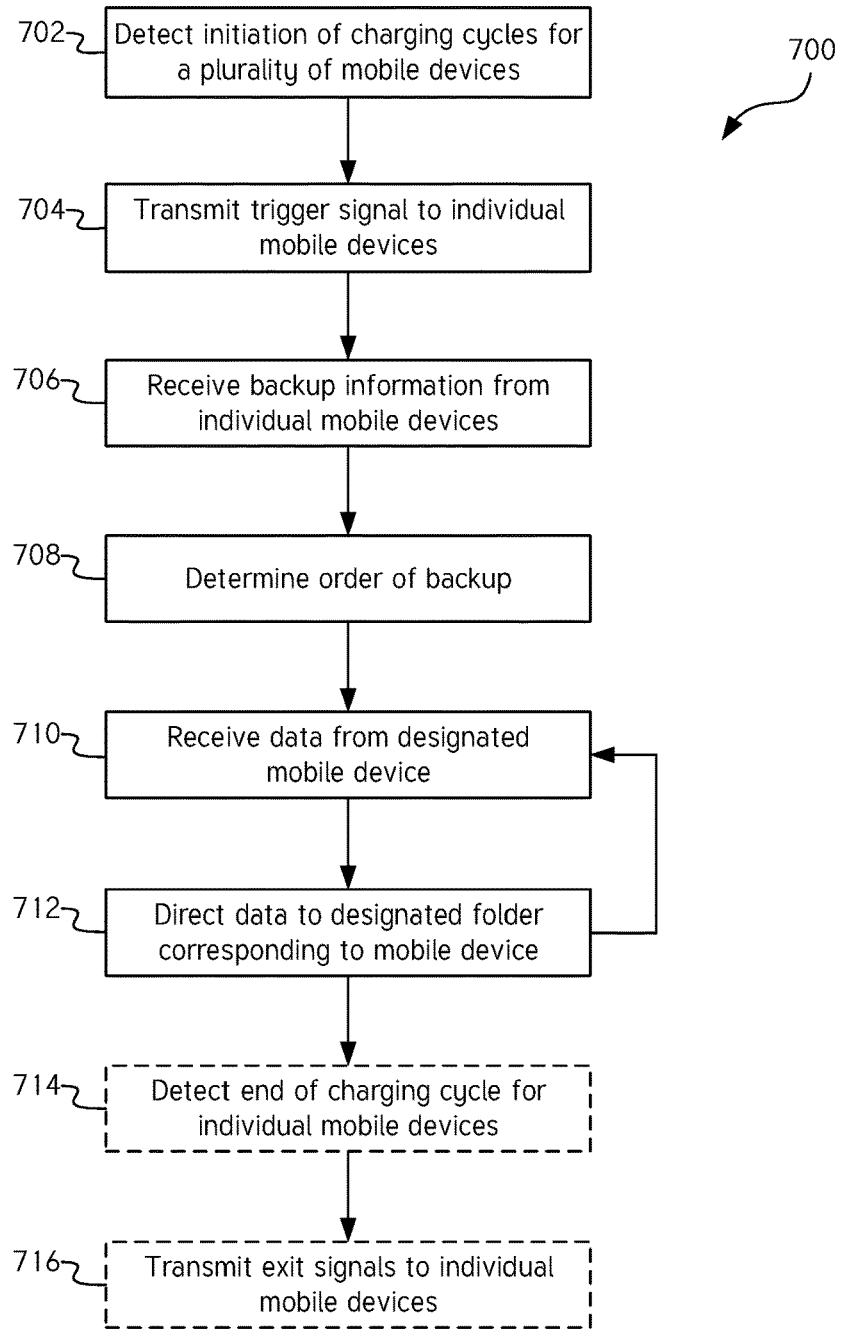
FIG. 7 illustrates a flow chart of an example process for backing up a plurality of mobile devices from a memory station that provides a combination of backup storage and charging.

FIG. 7 illustrates a flow chart of an example process 700 for backing up a plurality of mobile devices from a memory station that provides a combination of backup storage and charging. The process 700 may be implemented at least in part by a memory station. Accordingly, for ease of description, the process 700 is described herein as being performed by the memory station.

In block 702, the memory station detects initiation of charging cycles for a plurality of mobile devices. This detection can occur over a period of time so that the charging cycles for the plurality of mobile devices is not required to start simultaneously. For example, a first charging cycle can be initiated for first mobile device and after a period of time a second charging cycle can be initiated for a second mobile device.

In block 704, the memory station transmits trigger signals to individual mobile devices. The trigger signals can be transmitted and received by a plurality of mobile devices. In such implementations, the trigger signal can include information related to the particular mobile device for backing up. In some embodiments, the memory station is configured to transmit the trigger signal to multiple mobile devices and to receive data from multiple mobile devices during overlapping time periods.

In block 706, the memory station receives backup information from individual mobile devices. Responsive to the trigger signal, mobile devices can send initial information to the memory station to enable the memory station to determine an order for backing up of data from the mobile devices. The backup information can include device IDs, quantity of data to be backed up, and/or other information as described herein.

In block 708, the memory station determines an order of backup. The order of backup corresponds to an order in which the mobile devices are to transmit data for backup on the memory station. In some embodiments, the order depends at least in part on a quantity of data to be backed up. For example, the mobile device with the most data to be backed up can be slotted as the first device to back up data and so on. As another example, the mobile device with the least data to be backed up can be slotted as the first device to back up data and so on. In some embodiments, the order can be updated when a new charging cycle is detected in block 702. The mobile device that is receiving the new charging cycle can be inserted into the determined order in any suitable position (e.g., first, next, last, etc.).

In block 710, the memory station receives data from the mobile device that is next in the determined order. In block 712, the memory station directs this data to a designated folder that corresponds to the current mobile device that is transmitting data. The memory station then returns to block 710 to repeat this process until all connected mobile devices have backed up data and/or terminated charging.

In some embodiments, the memory station is also configured to detect an end of the charging cycle for individual mobile devices in block 714. Responsive to detecting termination of charging cycles, the memory station transmits exits signal in block 716. The exit signals can be transmitted and received by a plurality of mobile devices. In such implementations, the exit signal can include information related to the particular mobile device that terminated the charging cycle.

Figure 8:
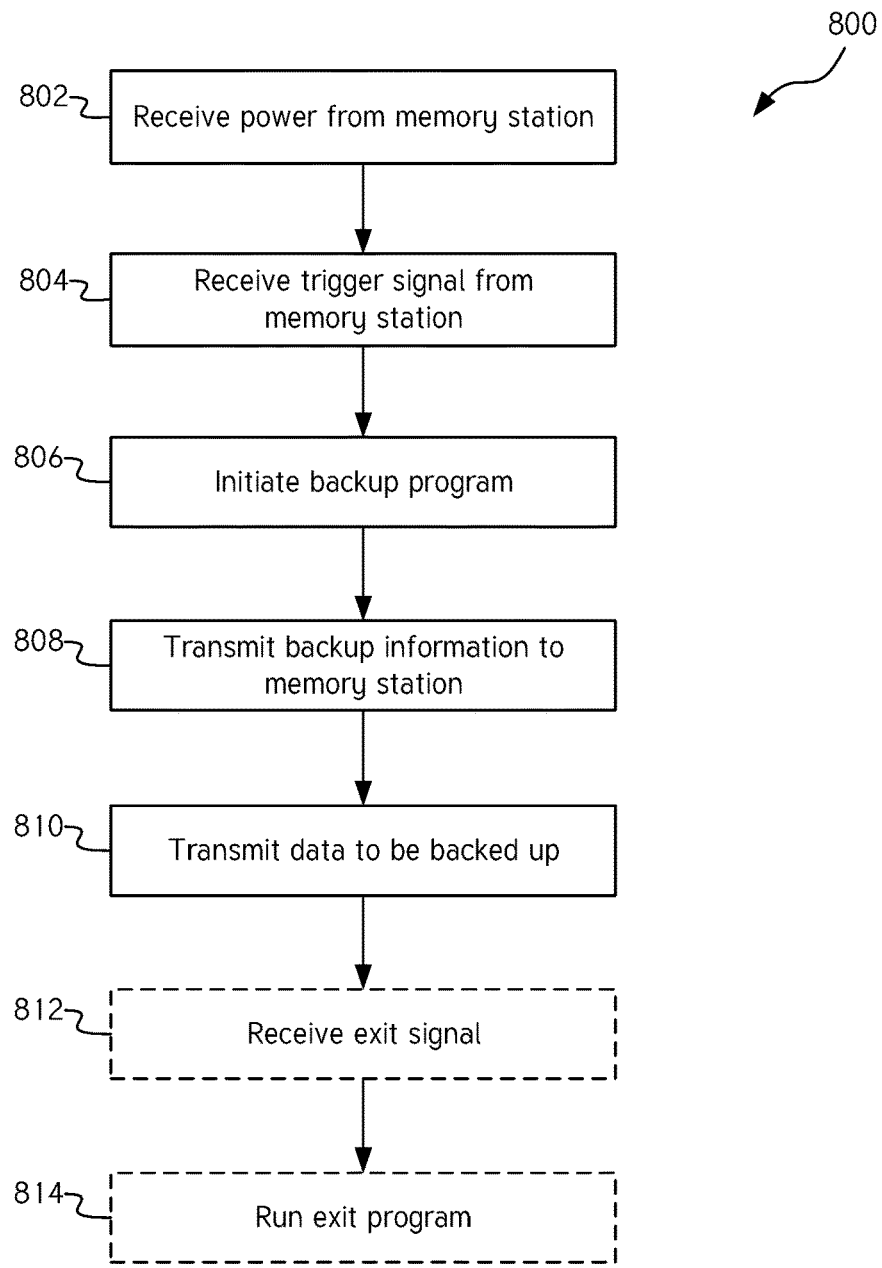
FIG. 8 illustrates a flow chart of an example process for backing up data to a memory station responsive to a trigger signal from the memory station.

FIG. 8 illustrates a flow chart of an example process 800 for backing up data to a memory station responsive to a trigger signal from the memory station. The process 800 may be implemented at least in part by a mobile device. Accordingly, for ease of description, the process 800 is described herein as being performed by the mobile device.

In block 802, the mobile device receives power from a memory station. The mobile device can direct this power to a rechargeable power source and/or to power the mobile device. The power can be received through a cable or wirelessly.

In block 804, the mobile device receives a trigger signal from the memory station. The trigger signal is received wirelessly, using an antenna. The trigger signal can be transmitted using a particular wireless communication protocol such as, BLUETOOTH Low Energy (BLE).

Responsive to receiving the trigger signal, the mobile device initiates a backup program in block 806. The backup program initiates without user intervention in response to the trigger signal. In some embodiments, the backup program waits to initiate after receiving the trigger signal. The period of time between receiving the trigger signal and initiating the backup program can be configured to ensure that a user has surrendered the mobile device for charging.

In block 808, the mobile device transmits backup information to the memory station. The information can be transmitted using a cable (e.g., wired communication) or wirelessly. The transmission of data from the mobile device can be done using the antenna and a second wireless communication protocol. In some embodiments, the wireless communication protocol of the trigger signal is different from the wireless communication protocol for sending backup information and backup data to the memory station.

In block 810, the mobile device transmits data to the memory station to be synchronized and/or backed up. Data can be transmitted using cables and/or it can be transmitted wirelessly.

In some embodiments, the mobile device is also configured to receive an exit signal in block 812. Responsive to receiving the exit signal, the mobile device runs an exit program and/or finishes the backup program. In some embodiments, the exit program is configured to cause the mobile device to display status information related to the backup process.

Additional Embodiments

As used herein, the term memory station includes, but is not limited to, a device that provides electrical power to recharge a battery of a mobile device in combination with data storage to synchronize and/or back up data from the same mobile device. Accordingly, it is to be understood that the memory station includes a device or devices that provides these functionalities and can be embodied using a number of different form factors in addition to those illustrated and described herein. In addition, as used herein, the term mobile device includes, but is not limited to, electronic devices that use, as their main source of power, a battery and that can store and/or generate data. Examples of mobile devices include smartphones, tablets, cameras, video recorders, music players, and devices that combine one or more features of such devices. Accordingly, it is to be understood that a mobile device is not to be limited to the form factors or embodiments illustrated and described herein.

Embodiments of disclosed memory stations can provide file-level, or object-level, data storage for one or more mobile devices. Although certain embodiments are disclosed herein in the context of files, file servers, file systems, and other file-level references, it should be understood that such references, as used herein, may refer to object-level data, or any other type of data structure, depending on the implementation. Embodiments of the disclosed memory stations may include hardware, software, or a combination of such elements, configured such that the memory station operates as a file server.

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A memory station comprising:
    a power module configured to provide electrical power to a power-coupled mobile device;
    a first antenna configured to transmit wireless signals complying with a first wireless communication protocol;
    a non-volatile memory module; and
    control circuitry coupled to the first antenna, to the power module, and to the non-volatile memory module and configured to:
        detect initiation of a charging cycle;
        transmit, through the first antenna, a trigger signal using the first wireless communication protocol, the trigger signal transmitted in response to detecting initiation of the charging cycle, the trigger signal configured to cause the mobile device to transmit backup information;
        receive, from the mobile device, backup information;
        receive, from the mobile device, data for storage on the non-volatile memory module; and
        store the received data in a location on the non-volatile memory module that corresponds to the mobile device.

2. The memory station of claim 1, further comprising a second antenna configured to transmit and receive wireless signals complying with a second wireless communication protocol different from the first wireless communication protocol.

3. The memory station of claim 2, wherein the control circuitry is further configured to receive the data for storage using the second antenna.

4. The memory station of claim 1, wherein the first antenna is further configured to transmit wireless signals complying with a second wireless communication protocol.

5. The memory station of claim 4, wherein the control circuitry is further configured to receive the data for storage using the second wireless communication protocol.

6. The memory station of claim 1, wherein the power module comprises a wireless transmitter that includes an electromagnetic emitting portion configured to transfer electrical power to a wireless receiver of the mobile device.

7. The memory station of claim 1, wherein the control circuitry is further configured to detect termination of the charging cycle.

8. The memory station of claim 7, wherein the control circuitry is further configured to:
    responsive to detecting termination of the charging cycle, transmit, through the first antenna, an exit signal using the first wireless communication protocol.

9. The memory station of claim 1, wherein the control circuitry is further configured to detect initiation of a second charging cycle corresponding to a second power-coupled mobile device.

10. The memory station of claim 9, wherein the second charging cycle at least partially overlaps the first charging cycle.

11. The memory station of claim 10, wherein the control circuitry is configured to receive and to store data for the second mobile device while receiving and storing data for the first mobile device.

12. The memory station of claim 1, wherein the control circuitry is further configured to delay transmission of the trigger signal after detecting initiation of the charging cycle.

13. The memory station of claim 1, wherein transmission of the trigger signal is delayed for more than 5 minutes after detecting initiation of the charging cycle.

14. A memory station comprising:
    a power module configured to provide electrical power to a plurality of power-coupled mobile devices;
    a first antenna configured to transmit wireless signals complying with a first wireless communication protocol;
    a non-volatile memory module; and
    control circuitry coupled to the first antenna, to the power module, and to the non-volatile memory module and configured to:
        detect initiation of individual charging cycles provided by the power module for individual mobile devices of the plurality of power coupled mobile devices;
        transmit, through the first antenna, a trigger signal using the first wireless communication protocol;
        receive, from the plurality of mobile devices, backup information;
        determine an order of backup based at least in part on the received backup information;
        receive, from a first power-coupled mobile device, first data for storage on the non-volatile memory module;
        store the received first data in a first location on the non-volatile memory module that corresponds to the first mobile device;
        receive, from a second power-coupled mobile device, second data for storage on the non-volatile memory module; and
        store the received second data in a second location on the non-volatile memory module that corresponds to the second mobile device,
    wherein the first data is received prior to the second data being received based on the determined order of backup.

15. The memory station of claim 14, further comprising a second antenna configured to transmit and to receive wireless signals complying with a second wireless communication protocol different from the first wireless communication protocol.

16. The memory station of claim 15, wherein the control circuitry is further configured to receive the first data for storage and the second data for storage using the second antenna.

17. The memory station of claim 14, wherein the first antenna is further configured to transmit wireless signals complying with a second wireless communication protocol.

18. The memory station of claim 17, wherein the control circuitry is further configured to receive the first data for storage and the second data for storage using the second wireless communication protocol.

19. The memory station of claim 14, wherein the order of backup is determined based at least in part on a quantity of data to be backed up.

20. A memory station comprising:
   power means for providing electrical power to a power-coupled mobile device;
   wireless transmission means for transmitting wireless signals complying with a first wireless communication protocol;
   non-volatile memory means; and
   control means in communication with the wireless transmission means, the power means, and the non-volatile memory means and configured to:
   detect initiation of a charging cycle;
   transmit, using the wireless transmission means, a trigger signal using the first wireless communication protocol, the trigger signal transmitted in response to detecting initiation of the charging cycle, the trigger signal configured to cause the mobile device to transmit backup information;
   receive, from the mobile device, backup information;
   receive, from the mobile device, data for storage on the non-volatile memory means; and
   store the received data in a location on the non-volatile memory means that corresponds to the mobile device.

21. The memory station of claim 20 further comprising a second wireless transmission means for transmitting and receiving wireless signals complying with a second wireless communication protocol different from the first wireless communication protocol.

22. The memory station of claim 21, wherein the control means is further configured to receive the data for storage using the second wireless transmission means.

23. The memory station of claim 20, wherein the wireless transmission means is further configured to transmit wireless signals complying with a second wireless communication protocol.

24. The memory station of claim 23, wherein the control means is further configured to receive the data for storage using the second wireless communication protocol.

25. The memory station of claim 20, wherein the power means includes an electromagnetic emitting portion for transferring electrical power to a wireless receiver of the mobile device.

26. The memory station of claim 20, wherein the control means is further configured to detect termination of the charging cycle.

27. The memory station of claim 26, wherein the control means is further configured to:
   responsive to detecting termination of the charging cycle, transmit an exit signal using the wireless transmission means, the exit signal complying with the first wireless communication protocol.

* * * * *